(12) United States Patent
Raphel et al.

(10) Patent No.: US 7,984,102 B1
(45) Date of Patent: Jul. 19, 2011

(54) SELECTIVE PRESENCE NOTIFICATION

(75) Inventors: Jose Raphel, Austin, TX (US); Kailash Kailash, San Jose, CA (US); Balakrishna Bhat Bayar, Bangalore (IN); Arcady V. Schekochikhin, Cupertino, CA (US); Jay Chaudhry, Saratoga, CA (US); Narasimha Datta Nataraja, Bangalore (IN)

(73) Assignee: Zscaler, Inc., Sunnyvale, CA (US)

( * ) Notice: Subject to any disclaimer, the term of this patent is extended or adjusted under 35 U.S.C. 154(b) by 221 days.

(21) Appl. No.: 12/177,570

(22) Filed: Jul. 22, 2008

(51) Int. Cl.
*G06F 15/16* (2006.01)
(52) U.S. Cl. ........................ 709/206; 709/205
(58) Field of Classification Search .................. 709/206, 709/205; 715/752
See application file for complete search history.

(56) References Cited

U.S. PATENT DOCUMENTS

| | | | |
|---|---|---|---|
| 6,757,722 B2 | 6/2004 | Lonnfors et al. | |
| 6,778,941 B1* | 8/2004 | Worrell et al. ............... | 702/176 |
| 6,839,735 B2* | 1/2005 | Wong et al. .................. | 709/204 |
| 7,035,923 B1 | 4/2006 | Yoakum et al. | |
| 7,269,627 B2* | 9/2007 | Knauerhase .................. | 709/206 |
| 7,299,257 B2* | 11/2007 | Boyer et al. ................. | 709/204 |
| 7,496,628 B2* | 2/2009 | Arnold et al. ................ | 709/206 |
| 7,555,523 B1* | 6/2009 | Hartmann .................... | 709/206 |
| 7,610,343 B2* | 10/2009 | Ikezawa et al. .............. | 709/206 |
| 7,636,753 B2* | 12/2009 | Wong et al. .................. | 709/204 |
| 7,640,300 B2* | 12/2009 | Wohlgemuth et al. ....... | 709/204 |
| 2003/0048195 A1 | 3/2003 | Trossen | |
| 2005/0080868 A1* | 4/2005 | Malik ........................... | 709/207 |
| 2005/0233776 A1* | 10/2005 | Allen et al. ................... | 455/567 |
| 2005/0246421 A1* | 11/2005 | Moore et al. ................. | 709/204 |
| 2006/0010205 A1* | 1/2006 | Beartusk et al. ............. | 709/205 |
| 2006/0045124 A1* | 3/2006 | Dahlstrom et al. .......... | 370/465 |
| 2006/0140189 A1* | 6/2006 | Wu et al. .................... | 370/395.2 |
| 2006/0200527 A1* | 9/2006 | Woods ......................... | 709/206 |
| 2007/0174399 A1* | 7/2007 | Ogle et al. ................... | 709/206 |
| 2007/0198725 A1* | 8/2007 | Morris ......................... | 709/227 |
| 2008/0005294 A1* | 1/2008 | Morris ......................... | 709/223 |
| 2008/0040461 A1* | 2/2008 | Kumbalimutt et al. ....... | 709/221 |
| 2008/0075066 A1* | 3/2008 | Baker .......................... | 370/352 |
| 2008/0208953 A1* | 8/2008 | Tian ............................. | 709/201 |
| 2008/0208984 A1* | 8/2008 | Rosenberg et al. .......... | 709/206 |
| 2008/0244026 A1* | 10/2008 | Holt et al. .................... | 709/206 |
| 2008/0250111 A1* | 10/2008 | Chen et al. ................... | 709/206 |
| 2008/0256200 A1* | 10/2008 | Elliston ........................ | 709/206 |
| 2008/0270544 A1* | 10/2008 | Howe ........................... | 709/206 |
| 2008/0307226 A1* | 12/2008 | Chow et al. .................. | 713/175 |
| 2008/0313321 A1* | 12/2008 | Kiss et al. .................... | 709/223 |
| 2008/0313323 A1* | 12/2008 | Morris ......................... | 709/224 |

(Continued)

FOREIGN PATENT DOCUMENTS

EP 1786172 A2 5/2007
WO WO 2008/020705 A1 2/2008

*Primary Examiner* — Alina N. Boutah
(74) *Attorney, Agent, or Firm* — Clements Bernard PLLC; Lawrence A. Baratta, Jr.; Christopher L. Bernard

(57) ABSTRACT

Methods, systems, and apparatus, including computer program products, for selective presence notification are provided. In one general aspect, a plurality of presence notification messages are monitored. Each presence notification message may include address information identifying at least one of a recipient or a sender of the presence notification message. Based on the address information a determination is made as to whether a presence notification message is allowable. If it is determined that the presence notification message is allowable, the transmission of the presence notification message is allowed.

16 Claims, 6 Drawing Sheets

U.S. PATENT DOCUMENTS

2009/0006566 A1* 1/2009 Veeramachaneni et al. .. 709/206
2009/0049135 A1* 2/2009 O'Sullivan et al. ........... 709/206
2009/0054091 A1* 2/2009 van Wijk et al. .............. 455/466
2009/0240829 A1* 9/2009 Hildebrand ................... 709/232
2010/0017472 A1* 1/2010 Benedyk et al. .............. 709/204
2010/0070581 A1* 3/2010 Hewes et al. ................. 709/206
2010/0094947 A1* 4/2010 Daniell et al. ................ 709/206
2011/0038483 A1* 2/2011 Goeller et al. ................ 380/282

* cited by examiner

SELECTIVE PRESENCE NOTIFICATION

BACKGROUND

This specification relates to data leakage prevention.

The unauthorized distribution of confidential information, such as trade secrets, financial information, and other sensitive information can be protected by a number of security measures, such as access restrictions, password protection, and encryption techniques. While such security measures are often effective, confidential information that is subject to such measures can still be distributed inadvertently or surreptitiously. Such disclosures can be characterized as "data leaks." For example, confidential information can be communicated by text in an e-mail message or an instant message; by attaching a document to an e-mail message; by accessing a company website over an unsecured network; and so on. Whether committed unintentionally or intentionally, the disclosure of confidential information by data leakage can cause financial harm, embarrassment, or other injury to a company or individual.

Instant messaging applications are particularly notorious for data leaks. In particular, instant messaging applications allow confidential information to be split into a series of instant messages with each independent instant message having no identifiable confidential information.

One solution for preventing data leakage through instant messaging systems is to block the ports on the network through which instant messaging applications communicate. However, this solution is problematic because instant messaging applications often provide productivity benefits and this solution results in the blocking of all instant messaging communication on the network. In addition, certain instant messaging protocols use common ports such as an HTTP port to negotiate ports to be used in instant messaging making port blocking ineffective.

SUMMARY

The subject matter disclosed in this specification is directed to selective presence notification. A plurality of presence notification messages is monitored. Each presence notification message may include address information identifying at least one of a recipient or a sender of the presence notification message. Based on the address information a determination is made as to whether a presence notification message is allowable. If it is determined that the presence notification message is allowable, the transmission of the presence notification message is allowed.

The subject matter described in this specification also includes other aspects. Additionally, one or more of the following optional advantages can be realized by implementations of the subject matter described in this specification. Data leakage through instant messaging systems may be minimized while maintaining the usage of instant messaging applications in an enterprise. Instant messaging privileges in an enterprise may be restricted based on user pairs, or by user membership in a group. Presence notification messages may be modified to comply with instant messaging preferences in an enterprise. The administration, maintenance, and upgrading of an instant messaging selective presence notification system for a plurality of enterprises is facilitated through an authority node. Enterprises with multiple locations need not maintain selective presence notification systems at multiple locations. The system automatically propagates instant messaging allowance data to multiple processing nodes reducing protection delays.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Presence notification messages connect the peers of instant messaging by announcing the presence of a participant. These messages are required before an instant messaging session can be instantiated. In an implementation, presence notification messages from and to instant messaging applications and servers are monitored. The presence notification messages are detected by examining the headers of instant messaging application packets according to known protocols for instant messaging applications. If a presence notification message is discovered, a determination is made of whether the presence notification message is allowable based on address information included in the presence notification message. In some implementations, the message is allowable if the sender and recipient(s) are part of the same company or enterprise. In other implementations, the message is allowable, if the sender and recipient(s) are part of the same group or department. In general, the message is allowable if each sender and recipient pair included in the address information match a stored list of allowable sender and recipient pairs. Allowable presence notification messages are allowed to transmit. Presence notification messages that are not allowable are discarded.

§2.0 Example Operating Environment

Figure 1:
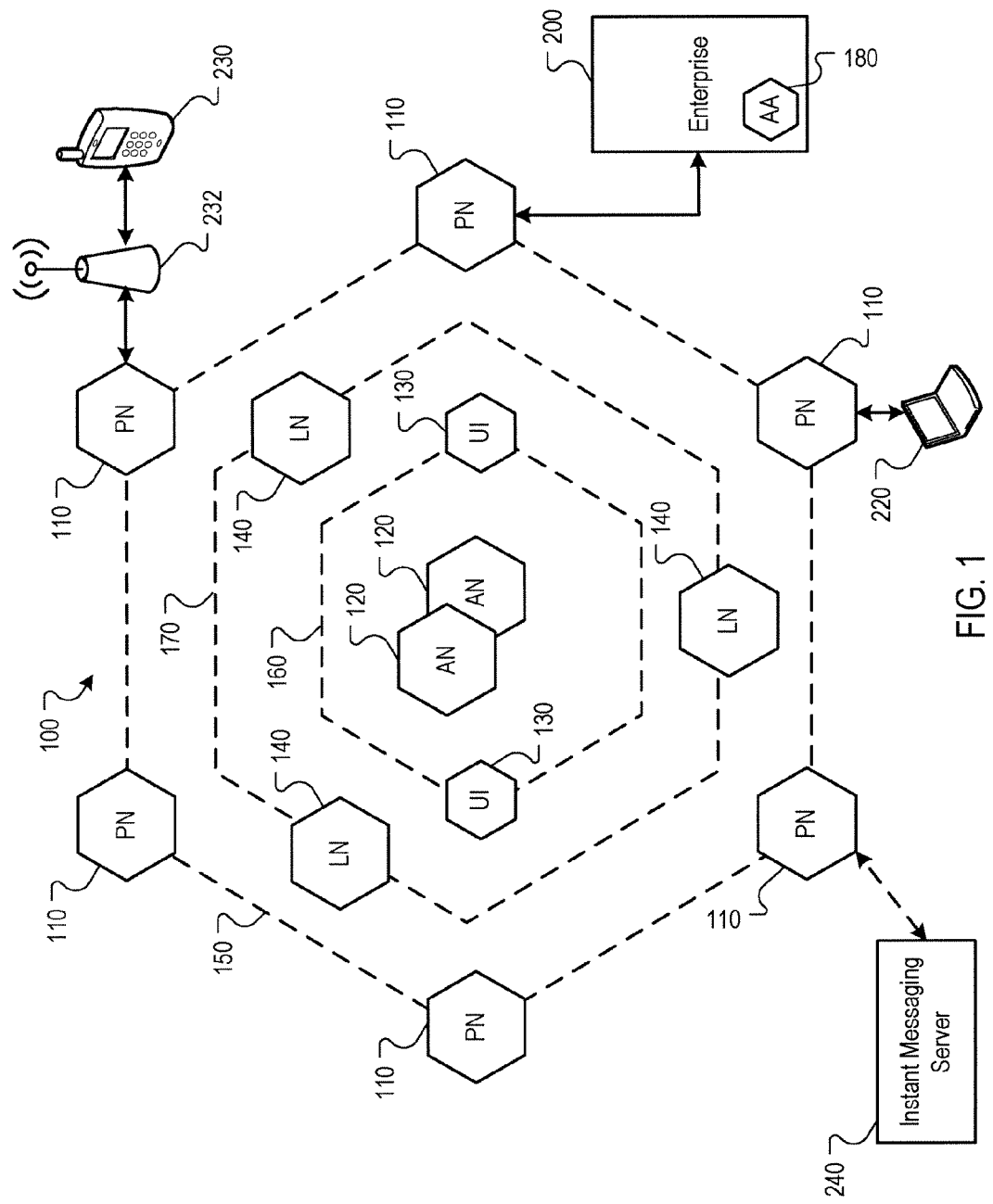
FIG. 1 is block diagram of a distributed security system in which selective presence notification may be used.

FIG. 1 is a block diagram of a distributed security system 100 in which selective presence notification may be used. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. The system can also prevent and minimize data leakage through instant messaging applications. Example external systems can include an enterprise 200, a computer device 220, a mobile device 230, and an instant messaging server 240 or other network and computing systems.

In an example implementation, each processing node 110 can include a decision system, e.g., data inspection engines that operate on a content item, e.g., a web page, a file, an e-mail message, instant message packet or some other data or data communication that is sent from or requested by one of the external systems. In some implementations, all data destined for or received from the Internet is processed through a processing node 110. In other implementations, specific data specified by each external system, e.g., only e-mail, only executable files, only instant messaging packet data etc., is process through a processing node 110.

In some implementations, a processing node 110 can monitor instant messaging application data. Instant messaging data may include presence notification messages sent from a sender (e.g., user device 220) to one or more recipients (e.g., mobile device 230). The presence notification messages may also be sent from a sender to an instant messaging server 240 and received from an instant messaging server 240 by one or more recipients. Presence notification messages may be used in an instant messaging server 240 to convey when a particular user or users are available or not available for instant messaging sessions, for example.

The processing node 100 can monitor presence notification messages and determine if the presence notification message is allowable using address information included in the presence notification messages. In some implementations, a presence notification message is allowable if it is a certain type of presence notification (e.g., a presence notification message from a user to an instant messaging server 240 stating that the user is available for an instant messaging session). In other implementations, a presence notification message is allowable if users associated with senders or recipient(s) of the presence notification message are associated with the same group or company.

In other implementations, a presence notification messages is allowable if the sender and recipients of the presence notification are matched against known allowable sender and recipient pairs, for example.

In other implementations, a presence notification message is allowable if phrases extracted from the presence notification message phrase match against stored allowable phrases. The allowable phrases may have been generated using the protocol used by the instant messaging system and a list of allowable sender and recipient pairs who are allowed to communicate using instant messaging, for example. A presence notification message may be allowable if it matches against the stored allowable phrases. The instant messaging protocol used can be the Extensible Messaging and Presence Protocol (XMPP), or other instant messaging protocols.

If a presence notification message is allowable, the presence notification message may be allowed to transmit. If the presence notification message is not allowable, then the message may be discarded or ignored. Alternatively, the presence notification message may be edited or modified to make the message allowable. For example, where a message is not allowable because one of the recipients is not in the same group as the sender, the message may be edited to remove the recipient and the edited message may then be transmitted.

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with an authority node 120. The authority node 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority node 120 can distribute the policy data to the access nodes 110.

In some implementations, the authority node 120 can also distribute instant messaging allowance data that defines rules for allowing, denying, or modifying presence notification messages. The instant messaging allowance data may help prevent data leakage through instant messaging applications by limiting the initiation of instant messaging sessions to instant messaging sessions between user in the same group, company, or to specified user pairs, for example. In some implementations, the instant messaging allowance data may be generated according to the instant messaging preferences and security policies of a corporation or entity associated with the system 100, for example. The distribution of instant messaging allowance data between the processing nodes 110 and the authority node 120 can implemented by push and pull distribution schemes, for example.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, instant messaging allowance data and data inspection engines and dictionaries for the processing nodes 110.

Other application layer functions can also be provided in the application layer, such as a user interface front-end 130. The user interface front-end 130 provides a user interface through which users of the external systems can provide and define data and security policies, e.g., policies for instant messaging applications, whether certain web sites are to be precluded, etc.

Another application capability that can be provided through the user interface front-end 130 is security analysis and report logging. The underlying data on which the security analysis and log reporting functions operate are stored in logging nodes 140, which serve as a data logging layer 170. Each logging node 140 can store data related to security operations, instant messaging applications, and network traffic processed by the processing nodes 110 for each external system.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

For example, a browser or instant messaging application may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

§3.0 Example Presence Notification Message Types

Many types of presence notification messages may be monitored. The types of presence notifications monitored may depend on the particular instant messaging protocol used for instant messaging. The following presence notifications are nine non-limiting examples of general types of presence notification messages that may be monitored by the processing node 110 using the XMPP protocol. However, other types of presence notification messages may be monitored for other protocols.

Knowledge of the types of the presence notification messages may be initially used by the processing node 110 to determine if a presence notification message is allowable, not allowable, or if further determination is needed to determine if the message is allowable. In some implementations, the types of the presence notification messages may be determined by examining the headers of the presence notification messages for indicators of type. However, other methods may also be used.

In the examples shown, the user is romeo@example.net, and has an available resource whose resource identifier is "orchard". A subscription of "to" indicates the user has a subscription to the contact's presence information, but the contact does not have a subscription to the user's presence information. A subscription of "from" indicates that the contact has a subscription to the user's presence information, but the user does not have a subscription to the contact's presence information. A subscription of "both" indicates that both the user and the contact have subscriptions to each other's presence information. For purposes of the examples illustrated, the user romeo@example.net may have the following contacts:

juliet@example.com (subscription="both" and has two available resources, one whose resource is "chamber" and another whose resource is "balcony")
benvolio@example.org (subscription="to")
mercutio@example.org (subscription="from")

An example instant messaging policy for an enterprise is that the user romeo@example.net is allowed to communicate to and receive instant messages from juliet@example.com. This may be expressed by the phrases:

P1=[presence from juliet example com to romeo example com]
P2=[presence from romeo example com to juliet example com]

A type 1 message is an initial presence notification message set by a user to an instant messaging server 240 in the form: <presence/>. In some implementations, this type of presence notification message may always be allowable by the processing node 110 because the message is to the instant messaging server and not sent to other users protected by the system 100, for example.

A type 2 message is a presence notification message sent by the instant messaging server 240 to user contacts with subscription="to" on behalf of the user's available resource in the form:
<presence
  type='probe'
  from='romeo@example.net/orchard'
  to='juliet@example.com'/>
<Presence
  type='probe'
  from='romeo@example.net/orchard'
  to='benvolio@example.org'/>

In some implementations, this type of presence notification message may always be denied by the processing node 110 if the contacts are not subscribed to the user's presence notification.

A type 3 message is a presence notification message sent by the instant messaging server 240 to user contacts with subscription="from" and subscription="both" on behalf of the user's available resource (i.e., orchard) in the form:
<presence
  from='romeo@example.net/orchard'
  to='juliet@example.com'/>
<presence
  from='romeo@example.net/orchard'
  to='mercutio@example.org'/>

In some implementations, this type of presence notification message may require further determination by the processing node 110 to determine if the recipients are allowable instant messaging contacts for the user romeo@example.com.

A type 4 message is a presence notification message sent by the instant messaging server 240 is in response to presence notification messages on behalf of all available resources in the form:

```
<presence
    from='juliet@example.com/balcony'
    to='romeo@example.net/orchard' xml:lang='en'>
    <show>away</show>
    <status>be right back</status>
    <priority>0</priority>
</presence>
<presence
    from='juliet@example.com/chamber'
    to='romeo@example.net/orchard'>
    <priority>1</priority>
</presence>
<presence
    from='benvolio@example.org/pda'
    to='romeo@example.net/orchard'
    xml:lang='en'>
    <show>dnd</show>
    <status>gallivanting</status>
</presence>.
```

In some implementations, this type of presence notification message may require further determination by the processing node 110 to determine if the senders are allowable instant messaging contacts for the user romeo@example.com.

A type 5 message is a presence notification message sent by the instant messaging server 240 that delivers a user's initial presence to all available resources or returns an error to user in the form:

```
<presence from='romeo@example.net/orchard'
    to='juliet@example.com/chamber'/>
<presence from='romeo@example.net/orchard
    to='juliet@example.com/balcony'/>
<presence
    type='error' from='mercutio@example.org'
    to='romeo@example.net/orchard'>
    error type='cancel'>
    <gone xmlns='urn:ietf:params:xml:ns:xmpp-stanzas'/>
    </error>
</presence>
```

In some implementations, this type of presence notification message may require further determination by the processing node 110 to determine if the users are allowable instant messaging contacts for the user romeo@example.com.

A type 6 message is a presence notification message sent from a user to another user not in his roster or contact list in the form:

```
<presence
    from='romeo@example.net/orchard'
    to='nurse@example.com' xml:lang='en'>
    <show>dnd</show>
    <status>courting Juliet</status>
    <priority>0</priority>
</presence>
```

In some implementations, this type of presence notification message may require further determination by the processing node 110 to determine if the recipient is an allowable instant messaging contact for the user romeo@example.com.

A type 7 message is a presence notification message sent by a user to the instant message server 240 for broadcasting to recipients in the form:

```
<presence xml:lang='en'>
    <show>away</show>
    <status>I shall return!</status>
    <priority>1</priority>
</presence>
```

In some implementations, this type of presence notification message may require further determination by the processing node 110 to determine if the recipients are allowable instant messaging contacts for the user romeo@example.com. In particular, the processing node 110 may determine if the recipients of the presence notification message are allowable instant messaging contacts for the user and may generate presence notification messages to each of the allowable recipients informing them of the user's presence.

A type 8 message is a presence notification message sent by the instant messaging server 240 for a particular user contact in the form:

```
<presence
    from='romeo@example.net/orchard'
    to='juliet@example.com' xml:lang='en'>
    <show>away</show>
    <status>I shall return!</status>
    <priority>1</priority>
</presence>.
```

In some implementations, this type of presence notification message may require further determination by the processing node 110 to determine if the user contact is an allowable instant messaging contact for the user romeo@example.com.

A type 9 message is a presence notification message sent by an Instant messaging server 240 to all of a user's available resources in several forms. For example, to be sent to the "balcony" resource, the form is:

```
<presence
    from='romeo@example.net/orchard'
    to='juliet@example.com' xml:lang='en'>
    <show>away</show>
    <status>I shall return!</status>
<priority>1</priority>
</presence>
```

To be sent to the "chamber" resource, the form is:

```
<presence
    from='romeo@example.net/orchard'
    to='juliet@example.com' xml:lang='en'>
    <show>away</show>
    <status>I shall return!</status>
    <priority>1</priority>
</presence>
```

In some implementations, this type of presence notification message may require further determination by the processing node 110 to determine if the resources are associated with allowable instant messaging contacts for the user romeo@example.com.

§4.0 Example Detailed System Architecture and Operation

Figure 2:
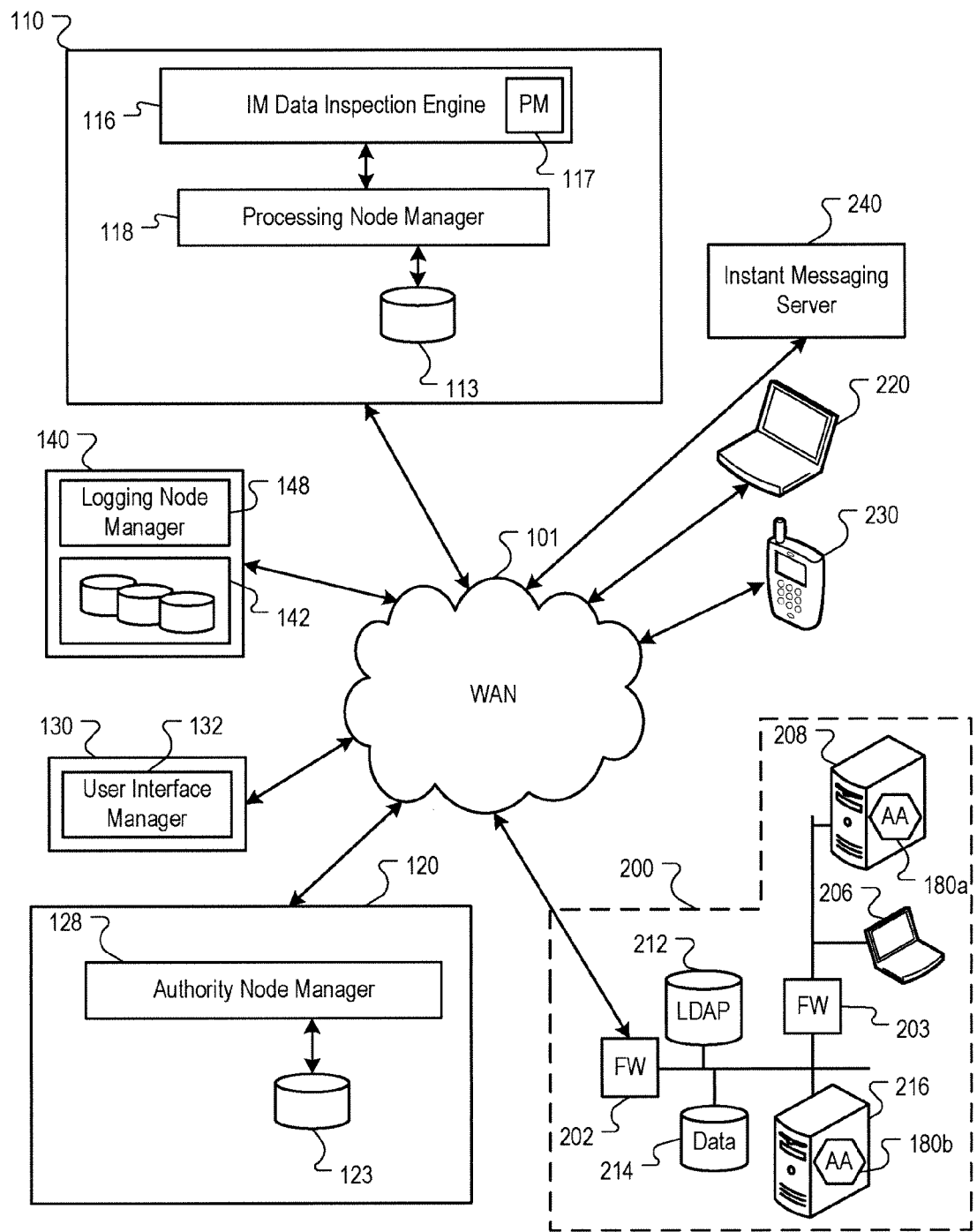
FIG. 2 is a block diagram of the system of FIG. 1 in which the components are illustrated in more detail.

FIG. 2 is a block diagram of the system of FIG. 1 in which the components of FIG. 1 are illustrated in more detail. Although only one representative processing node 110, authority node 120, user interface front-end 130, and logging node 140 are illustrated, there can be many of each of the processing nodes 110, 120, 130 and 140 present in the system 100.

A wide area network (WAN) 101, such as the Internet, or some other combination of wired and/or wireless networks, connects in data communication the processing node 110, authority node 120 and logging node 140. External systems 200, 220, 230 and 240 likewise communicate over the WAN 101 with each other or other data providers and publishers. Some or all of the data communication of each of the external systems 200, 220, 230 and 240 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

In some implementations, a client access agent 180a can be included on a client computer 208. The client access agent 180a can, for example, facilitate security processing by providing a hash index of files on the user computer 208 to a processing node 110 for malware and/or virus detection. Other security operations can also be facilitated by the access agent 180a.

In some implementations, a server access agent 180b can facilitate authentication functions with a processing node 110, e.g., by assigning tokens for passwords and sending only the tokens to a processing node 110 so that transmission of passwords beyond the network edge of the enterprise is minimized. Other functions and processes can also be facilitated by the server access agent 180b.

The computer device 220 and the mobile device 230 can also store information warranting security measures, such as personal bank records, medical information, and login information, e.g., login information to the server 206 of the enterprise 200, or to some other secured data provider server.

§4.1 Example Processing Node Architecture

In some implementations, the processing nodes 110 are external to network edges of the external systems 200, 220, 230 and 240. Each processing node 110 stores instant messaging allowance data 113 received from the authority node 120 and monitors instant messaging initiation requests sent from or to the external systems 200, 220, 230, and 240.

A processing node manager 118 can manage each content item, including instant messaging packet data in accordance with the in instant messaging allowance data 113 stored at the processing node 110, so that instant messaging policies for a plurality of external systems in data communication with the processing node are implemented external to the network edges for each of the external systems 200, 220 and 230.

The processing node manager 118 can be configured to monitor incoming messages to detect presence notification messages. The processing node manager 118 may detect the presence notification messages by examining message headers of incoming instant messaging application packets for a presence notification message indicator. However, other methods for determining if a message is a presence notification message may be used.

The processing node manager 118 may further determine the type of the presence notification message, and based on the determined type of the presence notification message, allow the transmission of the presence notification, deny the transmission of the presence notification message, or provide the presence notification message for further determination or modification by an instant messaging inspection engine 116. As described previously in section 3.0, there are 9 general types of presence notification messages used by instant messaging applications using the XMPP instant messaging protocol.

Each of these messages can be processed according to their message type. For example, messages of type 1 may be allowed transmission by the processing node manager 118, while messages of type 2 may be denied transmission by the processing node manager 118. Messages of types 3, 4, 5, 6, 8, and 9, may require further determination by the instant messaging data inspection engine 116 to determine if they are allowable, i.e., the addresses of the messages may be processed to determined if the addresses are allowable. Finally, messages of type 7 may be modified by the instant messaging data inspection engine 116 to remove disapproved or unrecognized addresses.

In some implementations, the type of a presence notification message may be determined by examining the header of the presence notification message. In other implementations, the type may be determined by searching the presence notification message for text strings indicative of a presence notification type for example.

The instant messaging data inspection engine 116 can determine for the processing node manager 118 if a presence notification message is allowable, or not allowable, based on address information included with the presence notification message and instant messaging allowance data 113. In some implementations, the address information may identify a sender and one or more recipients of the presence notification described in the presence notification message. For example, a presence notification message of type 3 may be sent by an instant messaging server on behalf of a user to one or more of the user's contacts. The address information of the presence notification message may indicate the user as the sender and each of the user's contacts as recipients of the presence notification message.

The instant messaging inspection engine 116 can determine if a presence notification message is allowable, or not allowable, by comparing sender and recipient pairs from the address information with allowable sender and recipient pairs stored in the allowance data 113. The allowance data 113 may include sender and recipient pairs identifying users who are allowed to instantiate instant messaging sessions between them. The allowable sender and recipient pairs may correspond to pairs of users in the same company, department, or group, for example. Restricting instant messaging sessions to users in the same department, company, or group may help minimize data leakage through instant messaging.

For example, the instant messaging inspection engine 116 may determine all sender and user pairs in the address information of the presence notification message. Continuing the example described above, a presence notification of type 3 may identify a sending user and one or more contact recipients. The sender and user pairs may include a sender and user pair for the sender and each of the contact recipients. The determined pairs may be compared against the allowable pairs, and if all of the determined pairs are in the allowance data 113, the presence notification message may be allowed to transmit. Alternatively, the instant messaging inspection engine 116 may modify the presence notification message to remove non-allowed sender and recipient pairs. For example, if the type 3 message included a sender and recipient pair that was not in the allowance data 113, the contact recipient in the pair that was not found in the allowance data 113 may be removed from the presence notification message, and the modified message may be transmitted by the processing node manager 118, for example. Thereafter, the recipients from the allowable sender and recipient pairs will be notified of the presence of the sender, while the recipient removed from the presence notification message will not be notified of the presence of the sender.

To identify the address information in a presence notification message, the instant message inspection engine 116 can use string matching or phrase matching. In some implementations, if the instant messaging protocol is known, then the instant message inspection engine 116 can parse the presence notification message and perform exact string matching, such as an exact string match for john@example.com.

In some implementations, the instant message inspection engine 116 can match against each character in a sliding window. For example, window can be a circular buffer and as each new character is entered into the window the contents of the window can be compared to a set of strings of address information. In some implementations, the instant messaging inspection engine 116 may determine if a presence notification message is allowable, or not allowable, using phrase matching. The instant messaging engine 116 may perform the phrase matching using the phrase matcher 117, for example. The instant messaging allowance data 113 may contain phrases associated with allowable presence notification messages. For example, the phrases may be generated from approved sender and recipient pairs to match the particular protocol used by the instant messaging system.

In some implementations, phrases are detected in the presence notification message by the phrase matcher 117 and matched against the phrases in the instant messaging allowance data 113. If all of the detected phrases match the phrases in the instant messaging allowance data 113, then the presence notification message may be allowed to transmit. Otherwise, the instant messaging inspection engine 116 may ignore or discard the presence notification message. Alternatively, the instant messaging inspection engine 116 may modify the presence notification message to remove the non-matching phrases. The modified message may be transmitted by the processing node manager 118.

For example, in some implementations, phrase detection is performed by the phrase matcher 117 using a buffer of size K, where K is the maximum number of phrase terms or words in all phrases in the instant messaging allowance data 113. A hash table is generated using each of the terms or words in the instant messaging allowance data 113. Each slot in the buffer can store a hash, such as a hash of a term of the presence notification message. When a hash is matched with a hash in the hash table, the hash is entered into the buffer and the buffer is advanced by one position.

The phrase matcher 117 can count intervening noise (e.g. terms, words, and other data that when hashed does not match one of the hashes of the hash table). If the noise exceeds a noise threshold, all hashes in the buffer are deleted and a new phrase match detection is started. If the buffer is full, and additional hashes of terms are matched, then the window may operate as a circular buffer. In this manner, terms of the presence notification message are received and processed, e.g., hashed and compared to the hashes of the phrase terms, according to the ordinal positions at which they are received.

Once the buffer includes a number of content term hashes equal to the cardinality of the set of the smallest phrase in the instant messaging allowance data 113, K-gram matches are attempted between the maximum and minimum lengths for all hashes stored in buffer.

Other phrase matching techniques can also be used.

Matching allowable user and recipient pairs using phrase matching may provide advantages over locating allowable user and recipient pairs using string matching, such as avoiding false matches for strings with certain prefixes and suffixes. For example, searching a presence notification for a string matching the user address john@example.com by use of a sliding window may falsely match the user addresses cjohn@example.com, pjohn@example.com, and john.example.com. In contrast, phase matching matches the word sequence and will therefore not match against a matching string having a prefix or suffix. In addition, the method of phrase matching described above does not require a prior knowledge of the instant messaging protocol being used.

The instant messaging inspection engine 116 may further monitor presence notification messages, and in some cases, generate presence notification messages in response to the monitored presence notification messages. For example, a presence notification message may inquire about the presence of a user A on behalf of a user B. If the instant messaging inspection engine 116 determines that the users A and B are an allowable user pair, the instant messaging inspection engine 116 may determine the presence or absence of user A in the system 100. For example, the instant messaging inspection engine 116 may determine the absence or presence of a user by from an authority node 120 or a logging node 140, for example. A presence notification message indicating the presence or absence of user A may then be generated by the instant messaging inspection engine 116 and transmitted by the processing node 110.

The example implementations described above perform selective presence notification in external systems, saving network resources in the external systems.

§4.2 Example Authority Node Architecture

In general, the authority node 120 includes a data store that stores master instant messaging allowance data 123 for each of the external systems 200, 220 and 230. An authority node manager 128 can be used to manage the instant messaging allowance data 123, e.g., receive input from users of each of the external systems defining different instant messaging policies and preferences, and can distribute the instant messaging allowance data 123 to each of the processing nodes 110. The processing nodes 110 then store a local copy of the instant messaging allowance data 123 as the instant messaging allowance data 113

The authority node 120 can generate instance messaging allowance data 123 for a variety of instant messaging systems based on input or instant messaging preferences from users of each of the external systems. In some implementations, the authority node 120 may receive a list of user pairs that are allowed to instantiate instant messaging sessions between them. The user pairs may indicate users in the same company, department, or user group, for example. The user pairs may also indicate user pairs with users in different companies who are also permitted to instantiate instant messaging sessions between them. The instant messaging allowance data 123 may include the user pairs.

In some implementations, the authority node 120 may further generate phrases using the allowed user pairs according to the particular instant messaging protocol that may be used. Each generated phase for a particular user pair may be used to phrase match with a presence notification message that includes the user pair as a sender and recipient. The instant messaging allowance data 123 may include the generated phrases.

5.0 Example Processes for Providing Selective Presence Notification

Figure 3:
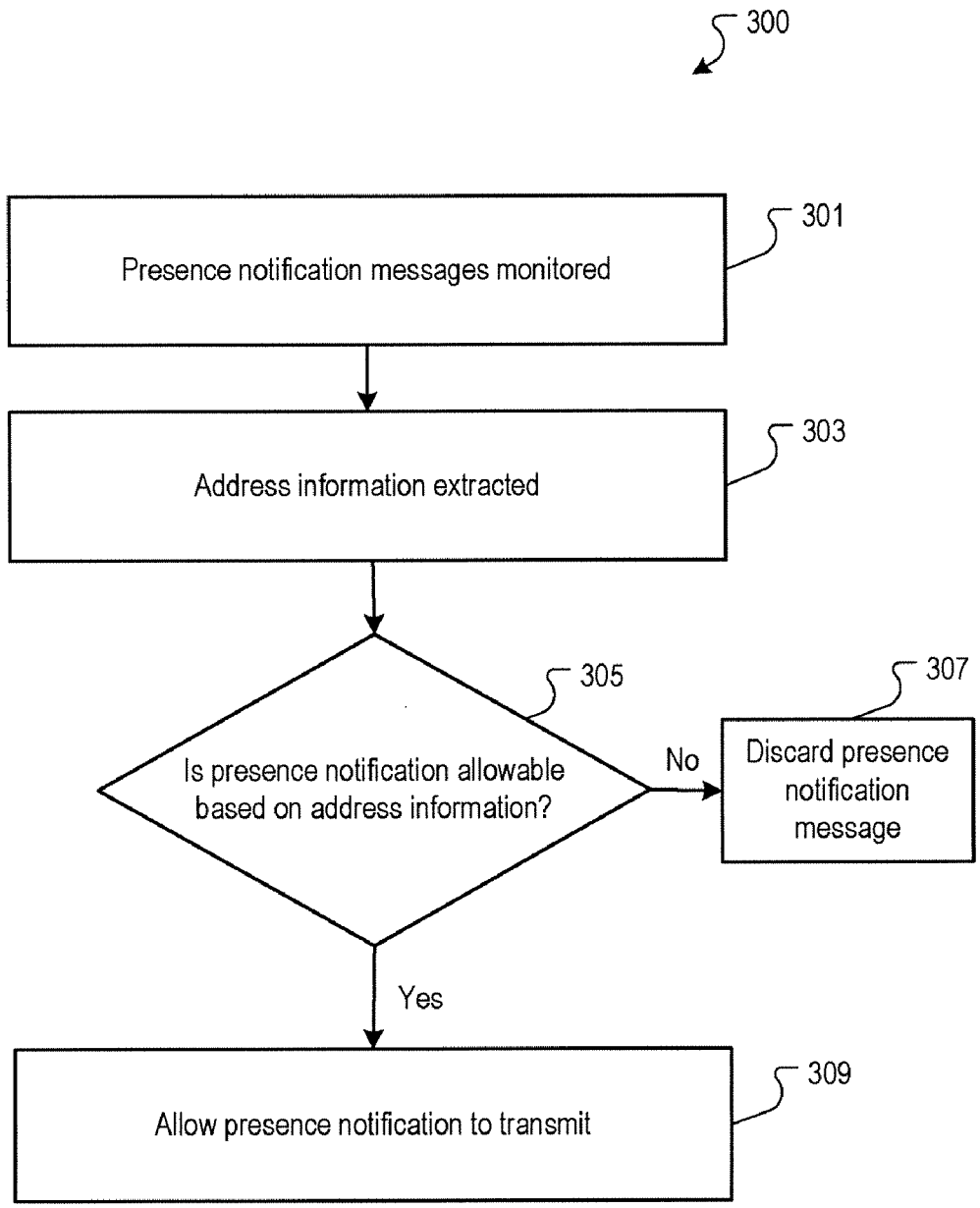
FIG. 3 is a flow diagram of an example process for selective presence notification.

FIG. 3 is a flow diagram of an example process 300 for selective presence notification. The process 300 can, for example, be implemented by a processing node 110.

Presence notification messages are monitored (301). In some implementations, presence notifications messages are monitored by the processing node manager 118 of a processing node 110. In some implementations, presence notification messages of certain types may be provided to an instant message data inspection engine 116 to determine if they are allowable. In other implementations, all presence notification messages may be provided to the instant message data inspection engine 116, for example.

Address information is extracted from a monitored presence notification message (303). The address information may be extracted from the presence notification message by the instant message data inspection engine 116, e.g., such as by a phrase matcher 117 or by comparing the addresses to a list of approved address information. The address information may identify at least one recipient or at least one sender of the presence notification message.

Whether a monitored presence information message is allowable is determined based on the address information (305). Whether the message is allowable may be determined by the instant message data inspection engine 116 based on the address and the instant message allowance data 113, for example.

In one implementation, the presence information message is allowable if the at least one sender or recipient is associated with an allowable company or group identified by the instant message allowance data 113. For example, a company associated with a sender or recipient may be determined by a domain of an email address of the sender or recipient extracted from the address information. The domain may be compared against a list of allowed domains in the instant message allowance data 113 and the presence notification message may be allowed if the domain is an allowed domain.

In another implementation, the presence information message is allowable if a sender and recipient pair extracted from the address information are matched with approved sender and recipient pairs in the instant message allowance data 113.

If the presence information message is allowable, then the processing node manager 118 may allow the presence information message to transmit (309). Else, the processing node manager 118 may discard the presence information message or otherwise prevent the presence information message from transmitting (307).

Figure 4:
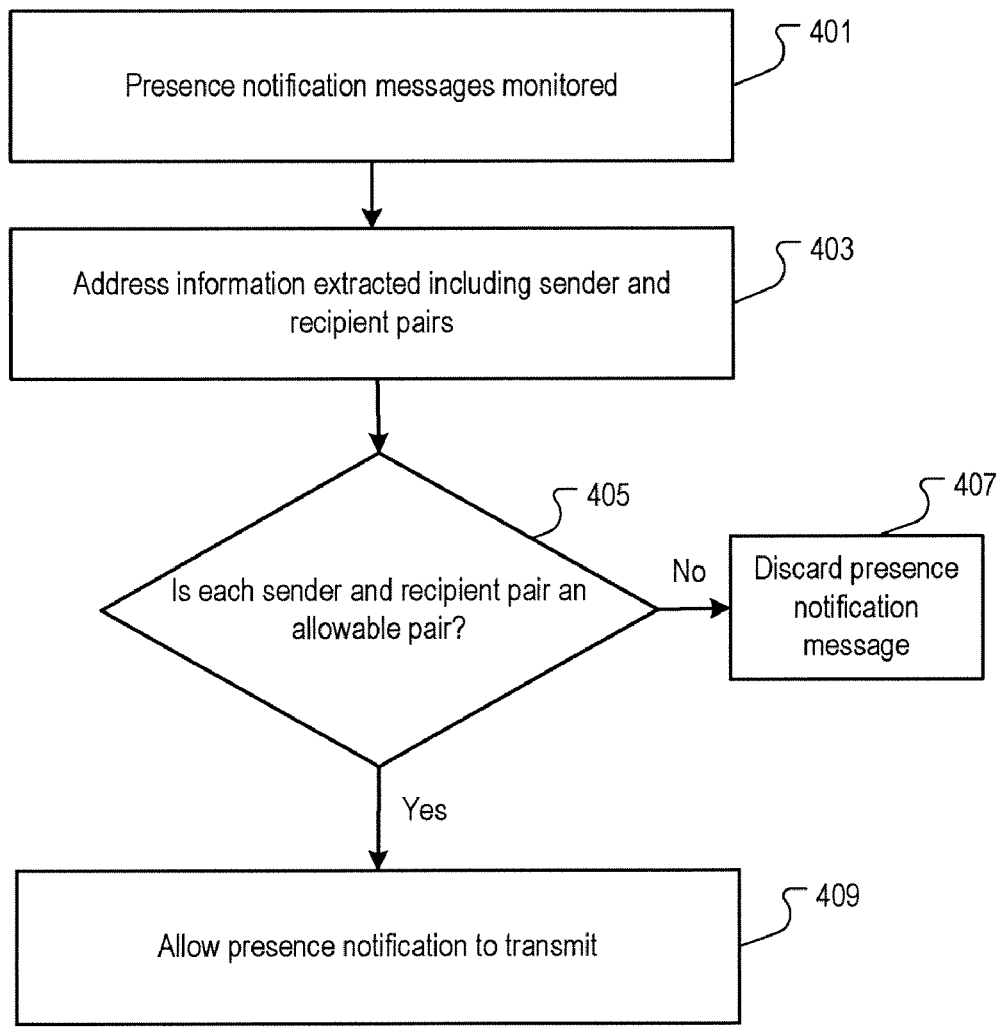
FIG. 4 is a flow diagram of another example process for selective presence notification.

FIG. 4 is a flow diagram of an example process 400 for selective presence notification. The process 400 can, for example, be implemented by a processing node 110.

Presence notification messages are monitored (401). In some implementations, presence notifications messages are monitored by the processing node manager 118 of a processing node 110. In some implementations, presence notification messages of certain types may be provided to an instant message data inspection engine 116 to determine if they are allowable. In other implementations, all presence notification messages may be provided to the instant message data inspection engine 116, for example.

Address information is extracted from a monitored presence notification message (403). The address information may be extracted from the presence notification message by the instant message data inspection engine 116, e.g., by identifying the addresses information according to an instant messaging protocol, or by use of phrase matching, or by some other identification process. The address information may include at least one sender and recipient pair.

Whether a monitored presence information message is allowable is determined based on the sender and recipient pair (405). Whether the message is allowable may be determined by the instant message data inspection engine 116 based on the sender and recipient pairs and the instant message allowance data 113, for example.

The instant message data inspection engine 116 may match the sender and recipient pairs against allowed sender and recipient pairs in the instant message allowance data 113. If each sender and recipient pair match an allowed sender and recipient pair, then the presence notification message is allowable. In some implementations, the allowable sender and recipient pairs may identify users in the group, company, or department, for example.

If the presence information message is allowable, then the processing node manager 118 may allow the presence information message to transmit (409). Else, the processing node manager 118 may discard the presence information message or otherwise prevent the presence information message from transmitting (407).

Figure 5:
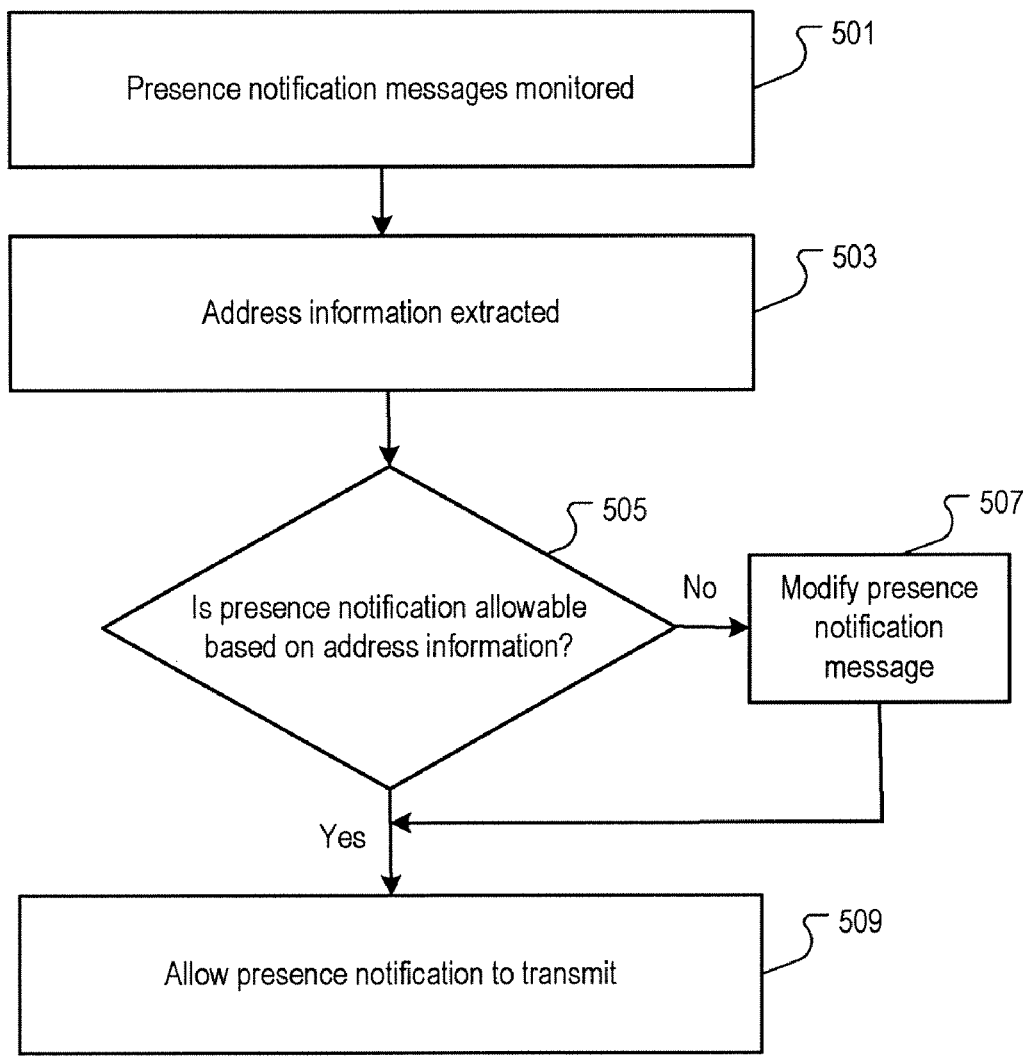
FIG. 5 is a flow diagram of another example process for selective presence notification.

FIG. 5 is a flow diagram of an example process 500 for selective presence notification. The process 500 can, for example, be implemented by a processing node 110.

Presence notification messages are monitored (501). In some implementations, presence notifications messages are monitored by the processing node manager 118 of a processing node 110. In some implementations, presence notification messages of certain types may be provided to an instant message data inspection engine 116 to determine if they are allowable. In other implementations, all presence notification messages may be provided to the instant message data inspection engine 116, for example.

Address information is extracted from a monitored presence notification message (503). The address information may be extracted from the presence notification message by the instant message data inspection engine 116. The address information may identify at least one recipient or at least one sender of the presence notification message.

Whether a monitored presence information message is allowable is determined based on the address information (505). Whether the message is allowable may be determined by the instant message data inspection engine 116 based on the address information and the instant message allowance data 113, for example.

In one implementation, the presence information message is allowable if the at least one sender or recipient is associated with an allowable company or group identified by the instant message allowance data 113. In another implementation, the presence information message is allowable if a sender and recipient pair extracted from the address information is matched with approved sender and recipient pairs in the instant message allowance data 113.

If the presence information message is allowable, then the processing node manager 118 may allow the presence information message to transmit (509).

If the presence information message is not allowable, the presence information message may be modified to comply with the instant message allowance data 113 (507). The presence notification message may be modified by instant message data inspection engine 116. For example, where the present information message was not allowable because of an unapproved sender and recipient pair, the instant messaging data inspection engine 116 may modify the presence notification message by removing the unapproved sender and recipient pair or unmatched phrase. The presence notification message may be modified according to the particular protocol used for the presence notification message. The modified presence information message may then be allowed to transmit by the processing node manager 118 (509).

Figure 6:
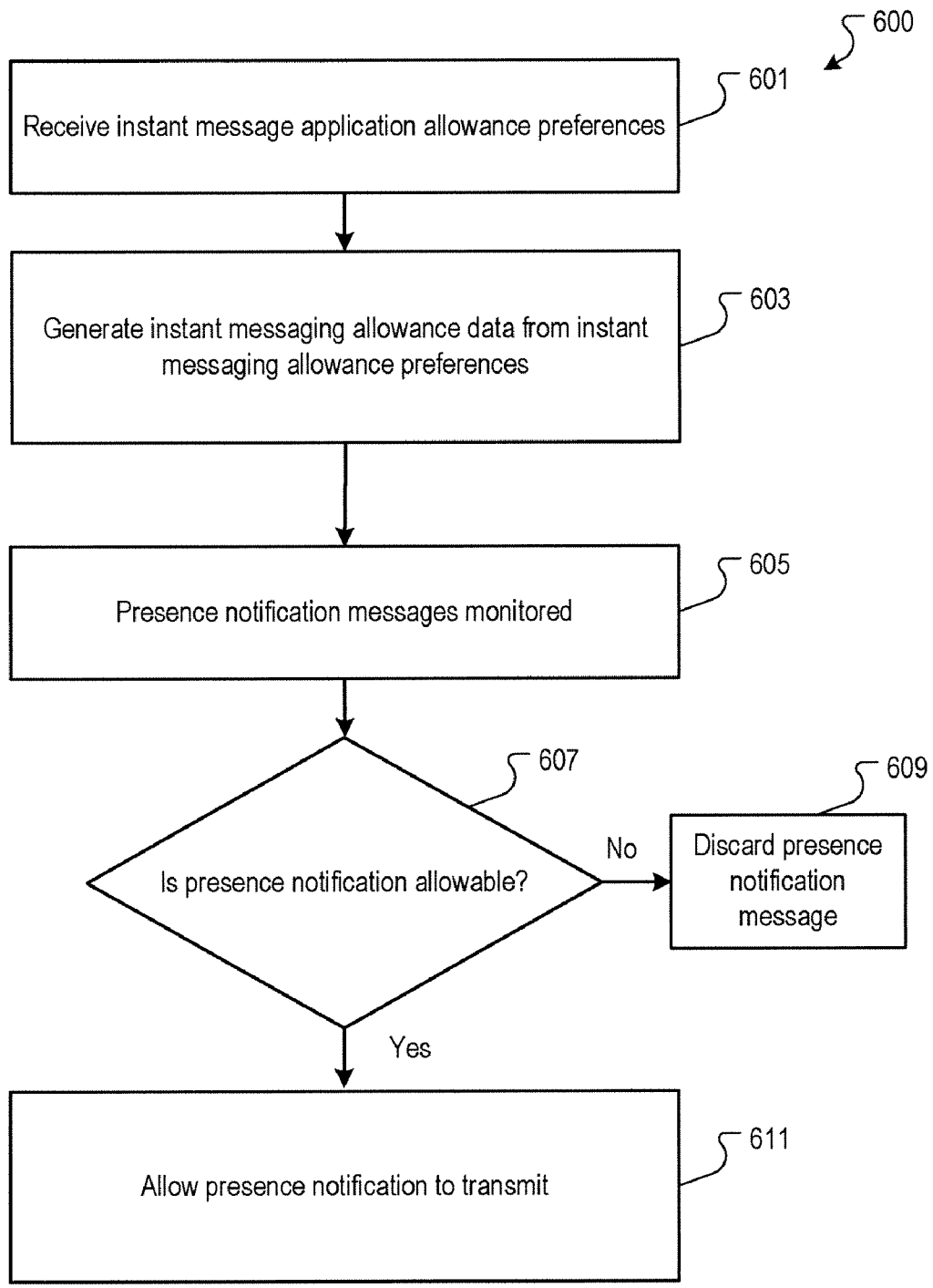
FIG. 6 is a flow diagram of another example process for selective presence notification.

FIG. 6 is a flow diagram of an example process 600 for selective presence notification. The process 600 can, for example, be implemented by an authority node 120 and a processing node 110.

Instant messaging application allowance preferences are received (601). In some implementations, the preferences may be received by an authority node 120 from an enterprise 200. The preferences may identify user pairs and user groups of that are allowed to participate in instant messaging sessions with one another, for example. The preferences may also indicate a protocol used by instant messaging applications in the enterprise 200, such as XMPP, for example.

Instant messaging allowance data may be generated from the instant messaging allowance preferences (603). The instant messaging allowance data is generated by an authority node manager 123 of an authority node 120. In some implementations, the instant messaging allowance data 123 may be generated by the authority node manager 128 according to the instant messaging protocol used by the enterprise 120. For example, the instant messaging allowance data 123 may comprise phrases generated using the identified user pairs in the instant messaging allowance preferences generating according to the instant messaging protocol. These generated phrases may then be phrase matched with monitored presence notification messages to identify allowable presence notification messages. The generated instant messaging allowance data 123 may be provided to one or more processing nodes 110 where it may be stored as the instant messaging allowance data 113, for example.

Presence notification messages are monitored (605). In some implementations, presence notifications messages are monitored by the processing node manager 118 of a processing node 110. In some implementations, presence notification messages of certain types may be provided to an instant message data inspection engine 116 to determine if they are allowable. In other implementations, all presence notification messages may be provided to the instant message data inspection engine 116, for example.

Whether a monitored presence information message is allowable is determined (607). Whether the message is allowable may be determined by the instant message data inspection engine 116 based on address information included in the presence notification message and the generated instant message allowance data 113.

In one implementation, the presence information message is allowable if each phrase in the presence notification message phrase matches against one or more stored generated phrases in the instant message allowance data 113. In another implementation, the presence information message is allowable if a sender and recipient pair extracted from the address information is matched with approved sender and recipient pairs in the instant message allowance data 113.

If the presence information message is allowable, then the processing node manager 118 may allow the presence information message to transmit (611). Else, the processing node manager 118 may discard the presence information message or otherwise prevent the presence information message from transmitting (609).

Although the presence notification processing herein has been described in the context of a distributed security system, software that performs the monitoring functions described above can also be deployed on a client device, or within an enterprise gateway. For example, a standalone software application can receive allowance data and can monitor instance message processes on a client device on which it is deployed.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method comprising:
   monitoring, by a computer, a plurality of presence notification messages, each presence notification message including address information;
   determining, by a computer, if a presence notification message is allowable based on the address information included in the presence notification message, wherein the address information identifies at least one of a recipient or a sender of the presence notification message, and wherein determining if a presence notification message is allowable comprises:
      determining if a sender of the presence notification message and a recipient of the presence notification message are an approved sender and recipient pair; and
      determining the presence notification is allowable if the sender of the presence notification message and the recipient of the presence notification message are an approved sender and recipient pair; and
   if the presence notification message is allowable, allowing, by a computer, transmission of the presence notification message.

2. The method of claim 1, further comprising:
   if the presence notification message is not allowable, modifying the address information of presence notification to make the presence notification message allowable; and
   allowing transmission of the modified presence notification message.

3. The method of claim 1, wherein the presence notification messages are messages in an instant messaging application.

4. The method of claim 1, wherein the presence notification messages are XMPP protocol messages.

5. The method of claim 1, wherein determining if the sender of the presence notification message and the recipient of the presence notification message are an approved sender and recipient pair comprises:
   matching the sender of the presence notification message and the recipient of the presence notification message against a list of approved sender and recipient pairs; and
   determining the sender of the presence notification message and the recipient of the presence notification message are an approved sender and recipient pair if sender of the presence notification message and the recipient of the presence notification message match an approved sender and recipient pair.

6. The method of claim 1, wherein determining if a sender of the presence notification message and a recipient of the presence notification message are an approved sender and recipient pair comprises determining whether the recipient and the sender belong to a same user group.

7. The method of claim 2, wherein modifying the address information comprises:
   identifying a particular sender and recipient pair that is not an allowable sender and recipient pair; and
   removing, from the address information, a recipient address for a recipient that is in the particular sender and recipient pair.

8. A system comprising:
   a plurality of processing nodes external to network edges of a plurality of external systems, each processing node comprising:
      at least one microprocessor; a processing node data store storing instant messaging allowance data for each of the external systems, the instant messaging allowance data specifying allowable sender and recipient pairs;
   an instant messaging data inspection engine configured to:
      determine if presence notification messages are allowable using address information included in the presence notification messages and the stored instant messaging allowance data, the address information specifying at least one sender and a plurality of recipients; and
      determine if a presence notification messages is allowable by determining if all possible pairs formed from the least one sender and each of the plurality of recipients of the address information match an allowable sender and recipient pair from the instant messaging allowance data; and
   a processing node manager in data communication with the instant messaging data inspection engine and configured to access the instant messaging allowance data stored in the processing node data store and to manage the presence notification messages according to the determination of the instant messaging inspection engine so that instant messaging policies for a plurality of external systems in data communication with the processing nodes are implemented external to the network edges for each of the external systems; and an authority node in data communication with the processing nodes, the authority node including an authority node data store storing instance messaging allowance data for each of the plurality of external systems, and including an authority node manager configured to provide the instant messaging allowance data to each of the processing node data stores.

9. The system of claim 8, wherein the allowable sender and recipient pairs identify users in a same user group.

10. The system of claim 8, wherein the allowable sender and recipient pairs identify users in a same domain.

11. The system of claim 8, wherein the processing node manager is configured to manage the presence notification messages according to the determination of the instant messaging inspection engine by being configured to perform operations comprising:

if the instant messaging data inspection engine determines that a presence notification message is allowable, allowing the presence notification message to be transmitted; and if the if the instant messaging data inspection engine determines that a presence notification message is not allowable, not allowing the presence notification message to be transmitted.

12. The system of claim 8, wherein the instant messaging allowance data comprises a set of allowable phrases, the phrases being generated from one or more allowable sender and recipient pairs, and the instant messaging data inspection engine is configured to determine if a presence notification message is allowable by:

identifying one or more phrases in the presence notification message;

phrase matching the identified one or more phrases in the presence notification message with one or more phrases from the set of allowable phrases; and determining that the presence notification is allowable if the identified one or more phrases match phrases from the set of allowable phrases.

13. The system of claim 8, wherein the authority node manager is further configured to receive instant messaging preference data from each of the plurality of systems, and generate the instant messaging allowance data from the received instant messaging preferences data.

14. The system of claim 13, wherein the generated instant messaging allowance data comprises a set of allowable phrases.

15. The system of claim 8, wherein the presence notification messages are XMPP protocol messages.

16. The system of claim 11, wherein:

the instant messaging data inspection engine is further configured to identify a particular sender and recipient pair that is not an allowable sender and recipient pair; and the processing node manager is further configured to remove, from presence notification messages, a recipient address for a recipient that is in the particular sender and recipient pair.

\* \* \* \* \*